Jan. 23, 1962  B. R. ADELMAN  3,017,743
ROCKET AND PROPELLANT CHARGE THEREFOR
Filed Jan. 20, 1956  2 Sheets-Sheet 1

INVENTOR.
B. R. ADELMAN
BY Hudson & Young
ATTORNEYS

3,017,743
ROCKET AND PROPELLANT CHARGE THEREFOR

Barnet R. Adelman, Los Angeles, Calif., assignor to Phillips Petroleum Company, a corporation of Delaware
Filed Jan. 20, 1956, Ser. No. 560,351
10 Claims. (Cl. 60—35.6)

This invention relates to rocket projectiles. In one aspect it relates to sustained-thrust rockets having a high total impulse. In another aspect it relates to a solid rocket propellant charge having a relatively long duration and capable of imparting a high total impulse. In another aspect it relates to a method of loading a rocket motor with a solid rocket propellant charge. In still another aspect it relates to a solid rocket propellant charge having an axial perforation and a variable burning rate either progressive or retrogressive across its web.

Solid propellant rockets may be classified in several categories depending on their size, shape and/or configuration of the charge, and on their utility (i.e., jet-assisted-take-off, booster, or missile). Each classification has specific problems relating to its requirements and specifications. The present invention generally relates to those rocket motors utilizing large sustainer propellant charges having relatively long durations and capable of imparting a high total impulse.

In the employment of rockets it is important that their propellant charges be ruggedly constructed so as to withstand the inertial, vibrational, and temperature-induced forces encountered during storage, handling or firing. These criteria are especially important in the case of large sustainer propellant charges because the latter involve scale-up problems of assembly not found in the prior art.

When large sustainer type charges are subjected to variable temperature cycles, for instance, between $-75$ and $170°$ F. in accordance with military specifications, temperature-induced stresses and strains in the charge occur and may cause cracking or fragmentation of the propellant material. When cracking of the propellant material occurs, an undesirable increase in the exposed burning surface area occurs resulting in inefficient operation of the rocket motor due to the development of excessive pressures. In more severe cases fragmentation of the propellant material arises and likewise results in inefficient operation of the rocket motor and in many cases present explosion hazards.

Since large sustainer-type charges may weigh as much as 6000 pounds or more, hazards in handling such large masses of material are encountered. These problems of handling large charges can be overcome to some extent by employing multiple propellent grains instead of a large single-grain charge. However, these multi-grain propellent charges are primarily fabricated for use in booster-type rockets, for example, to take advantage of their relatively short duration and where efficient operation of such rockets will be relatively unhampered by temperature effects on the rocket motor casing. If these multi-grain charges were employed in rockets having a relatively long duration, such as sustainer-type rockets, it would be necessary to operate at lower pressures or, alternatively, increase the weight of the rocket motor, or insulate the same, in order for the rocket motor casing to tolerate the temperature effects. However, either of these alternatives necessarily entails poor performance and/or increased expense of sustainer-type rockets.

Accordingly, I propose by the practice of this invention to provide an improved solid rocket propellent charge having an axial perforation with a variable burning rate across the web to compensate for the progressively increasing burning surface area and increasing volume of the axial perforation. The preferred rocket propellent charge of this invention generally comprises a plurality of concentric, cylindrical strata of propellent material. Said strata comprise in turn a plurality of individual rocket grains bonded to each other and to the rocket grains of propellent strata contiguous therewith. The resulting composite rocket propellent charge provided by this invention is loaded in a rocket motor combustion chamber by bonding a first series of individual rocket grains to the rocket motor casing with a "mortar" comprising a highly resilient rubbery binder with low oxidizer content and compatible with the propellent material of the rocket grains, thus forming a first cylindrical stratum of propellent material. Successive series of individual rocket grains are subsequently bonded to the previously charged cylindrical stratum of propellent material so as to provide a composite propellent charge having an axial perforation in which burning of the composite charge is initiated. The propellent composition of each of the concentric strata of rocket grains preferably have a relatively faster burning rate than the previously loaded cylindrical stratum of rocket grains and the "mortar" propellent material used for bonding the contiguous surfaces of the rocket grains has a burning rate which is preferably the average burning rate of the composite propellent charge. Alternatively, the burning rate of the mortar can be substantially the same as that of contiguous strata. Thus, when the burning of the composite propellent charge proceeds radially outward from the axial perforation, the burning rate of the composite rocket propellent can progressively decrease so as to compensate for the gradually increasing burning surface area and thereby maintain a constant rate of gas production. Alternatively, in order to compensate for the progressively increasing volume of the axial perforation, the propellent compositions of the various strata and mortar can be compounded so as to provide a non-linear regressive burning rate across the web of the composite charge.

An object of this invention is to provide an improved rocket propellant charge and method for loading the same in a rocket motor.

Another object is to provide an improved rocket propellent charge of such configuration and composition so as to compensate for the gross stresses and strains set up in the charge by temperature cycling.

Another object is to provide an improved rocket propellent charge having an axial perforation and characterized by a variable burning rate across the web of the charge so as to compensate for the increasing burning surface area and increasing volume of the axial perforation.

Another object is to provide an improved rocket motor, the operation of which will approach an ideal plateau-shaped time-pressure curve.

Another object is to provide an improved rocket propellent charge, such as the sustainer-type, having a relatively long duration and a high total impulse.

Another object is to provide an improved rocket propellent charge characterized by its safety of handling and ease of assembling in a rocket motor.

Other objects, advantages and features of this invention will become apparent to those skilled in the art from the accompanying specification, appended claims, and the drawings in which:

Figures 1, 2, 3:
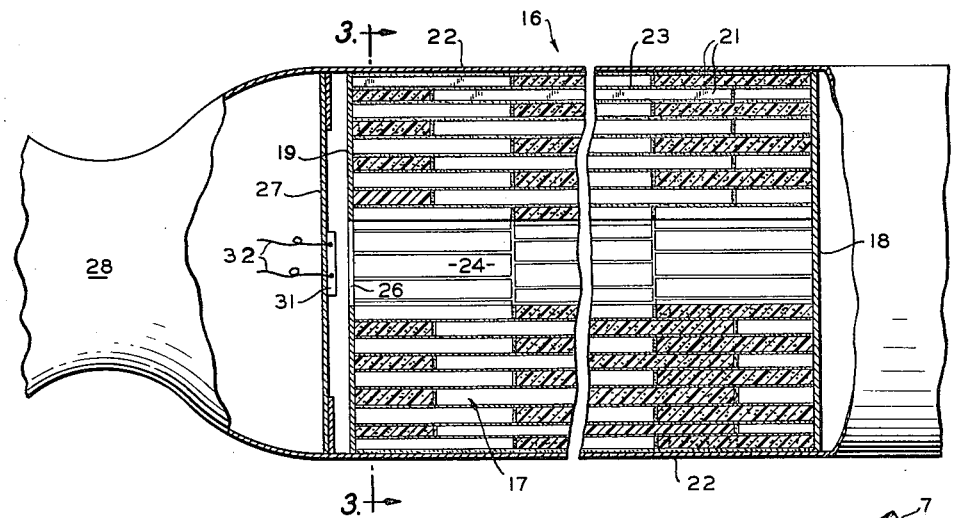
FIGURE 1 is an isometric view of an individual rocket grain.
FIGURE 2 is a cross-sectional view in elevation of a rocket motor having loaded therein a rocket propellent charge provided by the instant invention.
FIGURE 3 is a cross-sectional view of the rocket motor of FIGURE 2 taken along the plane 3—3.

Referring to the drawings now, and to FIGURE 1 in particular, a rocket grain 21 is shown having radial ends 7 and 8, outer curve wall 9 and inner curve wall 11, the length of the inside arc of the latter being slightly shorter than the length of the outside arc of the former.

In FIGURE 2, rocket motor generally designated 16 is shown loaded with a composite rocket propellent charge 17 bounded on either end by charge retaining plates 18 and 19 which may be secured by suitable means, such as bolts or the like, to the rocket case 22. The composite rocket propellent charge comprises a plurality of concentric, cylindrical propellent strata 21 which in turn comprise a plurality of individual rocket grains such as shown in FIGURE 1. The rocket grains of the outer cylindrical stratum 21 are bonded to the rocket motor casing 22 at their outer surface 9 by "mortar" propellent material 23. The rocket grains of stratum 21 are also bonded to each other at their ends 7 and 8, FIGURE 1, by propellent material 23. In a similar manner, subsequently loaded concentric strata are bonded to the previously loaded stratum. In FIGURE 2, the nine strata of propellent material have all been designated 21 for convenience, and it is to be understood that their dimensions and compositions may differ. The inner concentric stratum of rocket grains define the axial perforation 24.

Charge retaining plate 19 is provided with an axial opening 26 having a smaller or substantially the same diameter as axial perforation 24. A blow-out sealing disc 27 is positioned in the rocket motor casing 22 adjacent the nozzle portion 28 of the rocket motor 16. Nozzle portion 28 is constructed so as to define a venturi-like passage for the exhaust of combustion gases at high velocity, and a separate nozzle portion may be substituted for the integral construction shown. Suitable ignition means such as an electrically actuated igniter 31 is secured to blow-out disc 27 in proximity to the end of the axial perforation 24. Electric wires 32 are in intimate contact with the igniter composition of igniting means 31 and extend from the rocket motor 16 through the venturi passage to suitable contacts of a power source exterior to rocket motor 16.

Although I have described and illustrated a rocket projectile loaded with a single composite propellent charge, it is within the scope of this invention to provide a rocket projectile utilizing a plurality of such composite propellent charges, aligned for example in a tandem manner within the combustion chamber of a rocket projectile. In addition, I do not intend to limit the propellent charge configuration to that described or illustrated in detail herein and those skilled in the art will recognize configurations other than cylindrical can be adapted according to the operational requirements to be met, without departing from the scope of my invention. Moreover, while I prefer to utilize the composite charge of my invention in a rocket projectile so as to propel the same, I do not intend to so limit my invention and it is to be understood that the composite propellent charge can be employed for energizing gas pressure systems for the actuation of apparatus of various types, etc.

The propellent material utilized in fabricating the rocket grains of this invention can be prepared from a variety of known compounding materials. Particularly useful propellent compositions which may be utilized in the practice of this invention are of the rubbery copolymer-oxidizer type which are plasticized and worked to prepare an extrudable mass at 130° to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded propellent grains at temperatures preferably in the range of 170°–185° F. In addition to the copolymer binder and other ingredients, the propellent composition comprises an oxidizer and a burning rate catalyst.

Solid propellent compositions particularly useful in the preparation of the propellants used in this invention are prepared by mixing the copolymer with a solid oxidizer, a burning rate catalyst, and various other compounding ingredients so that the reinforced binder forms a continuous phase and the oxidizer a discontinuous phase. The resulting mixture is heated to effect curing of the same.

The copolymers are preferably formed by copolymerization of a vinyl heterocyclic nitrogen compound with an open chain conjugated diene. The conjugated dienes employed are those containing 4 to 6 carbon atoms per molecule and representatively include 1,3-butadiene, isoprene 2,3-dimethyl-1,3-butadiene, and the like. The vinyl heterocyclic nitrogen compound generally preferred is a monovinylpyridine or alkyl-substituted monovinylpyridine such as 2 - vinylpyridine, 3 - vinylpyridine, 4 - vinylpyridine, 2-methyl-5-vinylpyridine, 5-ethyl - 2 - vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed is in the range between 75 and 95 parts by weight per 100 parts monomers and the vinyl heterocyclic nitrogen is in the range between 25 and 5 parts. Terpolymers are applicable as well as copolymers and in the preparation of the former up to 50 volume percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML–4) plasticity value in the range of 10–40, preferably in the range of 15 to 25, and may be masterbatched with 5–20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex Marasperse-CB, or similar surface active agent, is added to the carbon black slurry or to the water used to prepare the slurry.

The following empirical formulation or recipe generally represents the class of propellent compositions preferred for the preparation of the propellent grains of this invention:

TABLE I

| Ingredient | Parts per 100 parts of rubber | Parts by weight |
| --- | --- | --- |
| Binder: | | 10–25 |
|   Copolymer (Bd/MVP) | 100 | |
|   Philblack A (a furnace black) | 10–30 | |
|   Plasticizer | 10–30 | |
|   Silica | 0–20 | |
|   Metal oxide | 0–5 | |
|   Antioxidant | 0–5 | |
|   Wetting agent | 0–2 | |
|   Accelerator | 0–2 | |
|   Sulfur | 0–2 | |
| Oxidizer (ammonium nitrate) | | 75–90 |
| Burning rate catalyst | | 0–30 |

Suitable plasticizers useful in preparing these propellent grains include TP-90-B (dibutoxyethoxyethyl formal supplied by Thiokol Corp.); benzophenone; and Pentaryl A (monoamylbiphenyl). Suitable silica preparations include a 10–20 micron size range supplied by Davison Chem. Co.; and Hi-Sil 202, a rubber grade material supplied by Columbia-Southern Chem. Corp. A suitable anti-oxidant is Flexamine, a physical mixture containing 25 percent of a complex diarylamine-ketone reaction product and 35 percent of N,N'-diphenyl-p-phenylenediamine, supplied by Naugatuck Chem. Corp. A suitable wetting agent is Aerosol-OT (dioctyl sodium sulfosuccinate, supplied by American Cyanamid Co.). Satisfactory rubber cure accelerators include Philcure 113 (SA-113 N,N-dimethyl-S-tertiary butylsulfenyl dithiocarbamate); Butyl-8 (a dithiocarbamate-type rubber accelerator supplied by R. T. Vanderbilt Co.); and GMF (quinone dioxime, supplied by Naugatuck Chem. Co.). Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamburg blue, laundry blue, washing blue, Williamson blue, and the like. Other burning rate catalysts such as ammonium dichromate, potassium dichromate, sodium dichromate, ammonium molybdate, and the like, can also be used.

The propellant mortar utilized for bonding the individual rocket grains to the rocket motor casing and to each other should preferably have a burning rate which is approximately the same as the average burning rate of the composite propellant charge, or for a more refined charge the burning rate of the mortar can be adapted to that of contiguous strata. The mortar should comprise a compatible rubbery binder preferably liquid in its uncured state and having incorporated therein a low oxidizer content. The usual rubber base cements are not particularly applicable since their burning rates are so slow that for all intents and purposes they are incombustible and they do not possess the desirable resiliency. A series of particularly useful polysulfide liquid polymer formulations which can be employed in the propellant mortar of the present invention are those such as LP-2, LP-3, and LP-8, prepared by the Thiokol Corp. When these polymers have incorporated therein ammonium perchlorate, which contains a higher percentage of oxygen than ammonium nitrate, low oxidizer loadings must be utilized to limit burning rate to the desirable range of 0.1 to 0.2 inch/sec. These formulations are characterized by their high resiliency due to the nature of the binder and to their relatively low oxidizer content, thereby when rocket grains are bonded with mortar made from these formulations they are less susceptible to the effects of shock and temperature induced forces. Suitable propellant mortar formulations for the preparation of resilient mortars having burning rates in the range of 0.1 to 0.2 inch per second are:

TABLE II

| Ingredient: | Weight percent |
|---|---|
| Ammonium perchlorate | 40–60 |
| LP-3 [1] | 35–55 |
| p-Quinone dioxime | 0–5 |
| Diphenyl guanidine | 0–3 |

[1] A liquid polymer prepared by the Thiokol Corp.

The following are examples which illustrate my invention and it is to be understood that they do not unnecessarily limit the same.

*Example I*

The following are typical propellent formulations prepared according to the method outlined above.

TABLE III

| Ingredient | Propellant A | | | Propellant B | | |
|---|---|---|---|---|---|---|
| | Parts per 100 parts of rubber | Total parts | Weight percent | Parts per 100 parts of rubber | Total parts | Weight percent |
| Binder: | | | | | | |
| Copolymer (90/10 Bd/MVP) | 100 | 11.765 | 11.53 | 100 | 11.764 | 11.53 |
| Philblack A | 20 | 2.353 | 2.30 | 20 | 2.353 | 2.30 |
| Benzophenone | 10 | 1.176 | 1.16 | [1] 20 | 2.353 | 2.30 |
| Pentaryl A | 10 | 1.176 | 1.16 | | | |
| SA-113 | 1 | 0.118 | 0.12 | 1 | 0.118 | 0.12 |
| Sulfur | 0.75 | 0.088 | 0.09 | 0.75 | 0.088 | 0.09 |
| Zinc oxide | 3 | 0.353 | 0.34 | 3 | 0.353 | 0.35 |
| Flexamine | 3 | 0.353 | 0.34 | 3 | 0.353 | 0.35 |
| Aerosol-OT | 1 | 0.118 | 0.12 | 1 | 0.118 | 0.12 |
| Oxidizer: [2] Ammonium nitrate | | 82.500 | 80.88 | | 82.500 | 80.88 |
| Burning rate catalyst: Milori blue | | | [3] Varies | | | [3] Varies |

[1] TP-90B substituted for benzophenone and pentaryl A in this formulation.
[2] Oxidizer I was used in Propellant A and Oxidizer IV in Propellant B (See Table IV).
[3] Suitable Milori blue contents are in the range 0–5 weight percent. For specific examples see Table V.

*Example II*

The ammonium nitrate oxidizer to be used in the propellent formulations of this invention was dried at 190°–200° F. for 6 hours or more, cooled and then pulverized. Four different ammonium nitrate oxidizers were prepared having different particle size by pulverizing them in a Mikro-Pulverizer at different hammer speeds and are tabulated below.

TABLE IV

| Ammonium nitrate oxidizer | Hammer speed (r.p.m.) | HB screen size (in.) |
|---|---|---|
| I | 9,800 | 0.035 |
| II | 3,500 | 0.125 |
| III | 14,000 | 0.035 |
| IV [1] | | |

[1] A blend of 70 percent Oxidizer II and 30 percent Oxidizer III.

*Example III*

Figure 4:
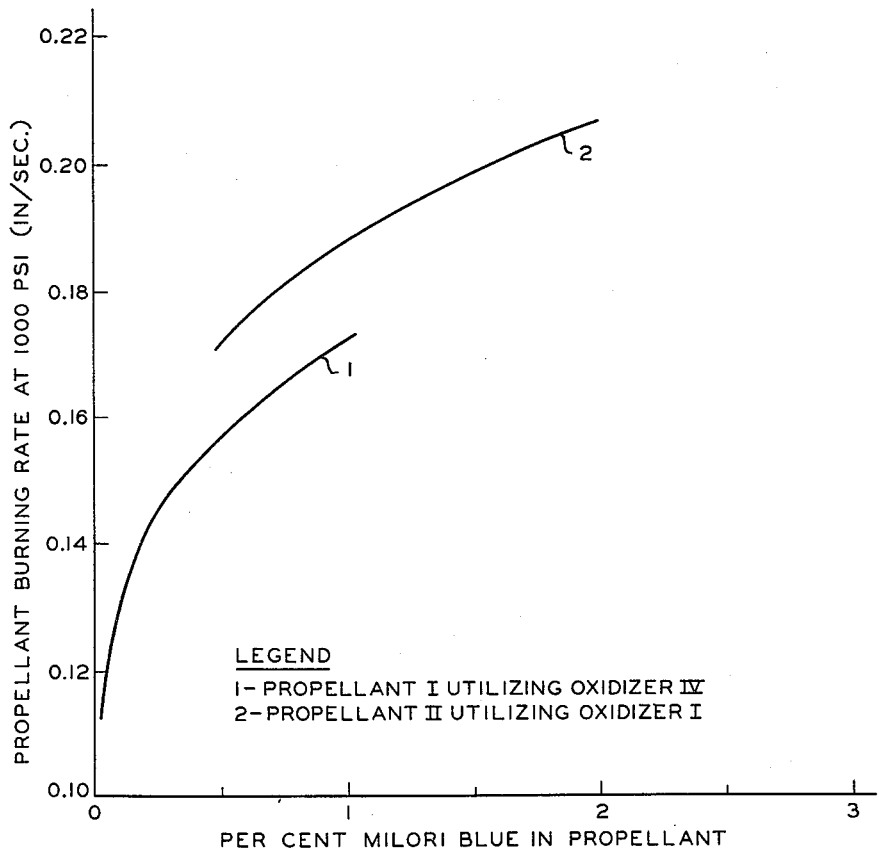
FIGURE 4 is a graph showing the variation in burning rate of various rocket propellent compositions with Milori blue content.

To determine the effects of different concentration of burning rate catalysts, such as Milori blue, and oxidizer particle size on the burning rate, several propellent compositions were prepared according to the formulations set forth in Table I. These various propellent compositions were fired and the burning rates at 1000 p.s.i. determined and plotted vs. the Milori blue content of the propellant. The graph shown in FIGURE 4 resulted which shows that increase of the Milori blue content in the propellent composition increases the burning rate of the latter.

*Example IV*

A specific example of a rocket motor utilizing the rocket propellent charge of the instant invention will now be described to illustrate my invention.

For the construction of a sustainer rocket in accordance with this invention having a total impulse of 1,000,000 lbs. and a duration of 60 seconds, it is desirable to utilize propellants having burning rates in the range of 0.10 to 0.20 inch per second. The composite propellant charge will have an average burning rate of 0.15 inch per second and a 9 inch web. Six thousand lbs. of propellant made in accordance with the method previously given and specified in Table III are required to deliver the required total impulse. It is desirable to load 84 percent of the combustion chamber space, leaving 16 percent free space. The rocket motor case will have an inside diameter of approximately 30 inches and will have a combustion chamber 16 feet long. The composite propellent charge will have a perforation 12 inches in diameter and 9 concentric strata of rocket grains. The thickness of the mortar will be approximately 0.1 inch. The rocket grains are extruded into slabs weighing 9–24 lbs., the grains of each stratum having their own specific dimensions and varying in length from 2 to 4 ft. All grains are 0.90±0.05 inch in thickness.

In the following Table V are specifications for the rocket grains to be utilized in meeting the above requirements. Stratum "a" designates the outer stratum of propellent material, i.e., that stratum bonded to the rocket case, and the subsequently loaded strata have been correspondingly designated in alphabetical order with stratum "i" representing the inner stratum, i.e., that stratum which defines the central perforation of the composite propellent charge.

TABLE V

| Stratum | O.d., in. ±.05 | I.d., in. ±0.05 | Number of grains | $l_o$ in.[1] ±0.05 | $l_i$ in.[2] ±0.05 | Propellant formulation (Table I) | Milori blue content (percent) | Burning rate at 1,000 p.s.i. (in./sec.) |
|---|---|---|---|---|---|---|---|---|
| a | 30 | 28 | 10 | 9.32 | 8.70 | B | 0.0 | 0.11 |
| b | 28 | 26 | 10 | 8.89 | 8.06 | B | 0.025 | 0.12 |
| c | 26 | 24 | 9 | 8.98 | 8.28 | B | 0.10 | 0.13 |
| d | 24 | 22 | 9 | 8.28 | 7.59 | B | 0.18 | 0.14 |
| e | 22 | 20 | 8 | 8.78 | 7.78 | B | 0.32 | 0.15 |
| f | 20 | 18 | 7 | 8.90 | 7.99 | B | 0.58 | 0.16 |
| g | 18 | 16 | 7 | 7.99 | 6.90 | B | 0.86 | 0.17 |
| h | 16 | 14 | 6 | 8.34 | 7.30 | A | 0.70 | 0.18 |
| i | 14 | 12 | 6 | 7.30 | 6.27 | A | 1.05 | 0.19 |

[1] $l_o$, outside length of arc of grain.
[2] $l_i$, inside length of arc of grain.

The individual rocket grains utilized in constructing the composite rocket propellent charge of my invention can be extruded, cast, or molded into shapes such as illustrated in FIGURE 1. In loading the rocket motor combustion chamber of FIGURE 2 the initial cylindrical stratum of rocket grains is bonded to the rocket casing with propellent mortar having a composition such as set forth in Table II. Each succeeding cylindrical stratum of rocket grains is bonded to the previously loaded cylindrical stratum in a similar manner, and their rocket grains are preferably staggered with respect to the rocket grains of the previously loaded stratum in a brickwall-like manner. The number of strata of propellent material loaded in the rocket motor combustion chamber will of course be dictated by the desired rocket motor performance and I do not intend to limit my invention to any particular number. However, since ignition of the composite propellent charge is initiated in the axial perforation of the charge, the number of strata will necessarily be limited accordingly.

The ignition of the propellent charge is initiated by the firing of a suitable primer. The resulting flame and combustion gas from this ignition primer propagate through the length of axial perforation in a well known manner and inner surface of the innermost cylindrical stratum, defining the boundary of the same, ignites thereby. Ignition of the composite propellent charge then proceeds radially outward from this inner surface of the initially ignited stratum. As buring of the propellent charge progresses across the web of the charge, i.e. through the several concentric cylindrical propellent strata, the burning surface area increases. In order to maintain a constant thrust, i.e., a uniform rate of gas production, the increase in burning surface area is compensated for by the gradually decreased burning rate of each subsequently ignited stratum of propellant. Since the propellant mortar used to bond the rocket grains has a burning rate which is substantially the average burning rate of the composite charge, the ignition of the latter is substantially progressive and not intermittent.

It is to be understood that I do not wish to limit the construction of the propellant charge to that described and illustrated herein and the individual rocket grains can be assembled in configurations other than the brickwall-manner shown, e.g., in a mosaic-like pattern, to obtain unique variations in burning surface with time. That configuration to be employed for any desirable operational performance will be apparent to those skilled in the art once acquainted with my invention.

While I have described and illustrated my invention in its preferred embodiments, I do not wish to unnecessarily limit it thereto and various modifications of this invention will become apparent to those skilled in the art without departing from the scope or spirit of my invention.

I claim:
1. A composite solid propellent charge generally cylindrical in form and having an axial perforation, comprising, in combination, a plurality of concentric cylindrical strata of propellant material, each of said strata comprising a plurality of cylindrical segmental grains bonded together at their sides and to grains of other contiguous strata at their outer and inner surfaces, said axial perforation being defined by the exposed inner surface of the innermost strata, said propellant material comprising a mixture of ammonium nitrate and a copolymer made by copolymerizing 1,3-butadiene and 2-methyl-5-vinylpyridine.

2. A composite solid propellent charge generally cylindrical in form and having an axial perforation, comprising, in combination, a plurality of concentric cylindrical strata of propellant material, each of said strata comprising a plurality of cylindrical segmental grains bonded together at their sides and to grains of other contiguous strata at their outer and inner surfaces, said axial perforation being defined by the exposed inner surface of the innermost strata, wherein said propellant material comprises a mixture of ammonium nitrate, Milori blue, and a rubbery copolymer made by copolymerizing 1,3-butadiene and 2-methyl-5-vinylpyridine, and wherein said propellant mortar comprises a mixture of a polysulfide liquid polymer and ammonium perchlorate.

3. A composite solid propellent charge generally cylindrical in form and having an axial perforation, comprising, in combination, a plurality of concentric cylindrical strata of propellant material, each of said strata comprising a plurality of cylindrical imperforate segmental grains bonded together at their sides and to grains of other contiguous strata at their outer and inner surfaces, said axial perforation being defined by the exposed inner surface of the innermost strata, said propellant material comprising a mixture of a rubbery binder and an inorganic oxidizing salt, said rubbery binder comprising a rubbery copolymer of a conjugated diene having 4 to 6 carbon atoms per molecule and a vinyl pyridine, the ends and outer cylindrical surface of said propellant charge being restricted.

4. A composite solid propellant charge for a jet-propelled device, said charge being generally cylindrical in form, restricted at its ends and its outer cylindrical surface and having an axial perforation, said charge comprising a plurality of segmented concentric cylindrical strata, each of said strata comprising a plurality of cylindrical imperforate segments of propellant material bonded together and to segments of contiguous strata with a propellant mortar, said axial perforation being defined by the exposed inner surface of the innermost strata, said charge having a variable burning rate across its web, said propellant material comprising a mixture of an inorganic oxidizing salt and a rubbery copolymer formed by polymerizing a vinyl pyridine and a conjugated diene having 4 to 6 carbon atoms per molecule.

5. A composite solid propellant charge according to claim 4 wherein the burning rate of said charge is progressive across said web.

6. A jet-propelled device comprising, in combination, an exhaust nozzle, a casing defining a combustion chamber, and a composite solid propellant charge disposed in said chamber, said charge generally cylindrical in form and having an axial perforation, said charge comprising a plurality of concentric cylindrical strata of propellant material, each of said strata comprising a plurality of cylindrical imperforate segments bonded together and to other strata contiguous therewith with a propellant mortar, said axial perforation defined by the exposed inner surface of the innermost strata, said charge being restricted at its ends and at its outer surface, the latter surface being bonded to said casing, said propellant material comprising a mixture of an inorganic oxidizing salt and a rubbery copolymer formed by polymerizing a vinyl pyridine and a conjugated diene having 4 to 6 carbon atoms per molecule.

7. A jet-propelled device comprising an exhaust nozzle, a casing defining a combustion chamber, a composite solid propellant charge disposed in said chamber, and means for igniting said charge, said charge having a generally cylindrical form, an axial perforation, and a variable burning rate across its web, said charge comprising a plurality of cylindrical imperforate segmental grains bonded together at their sides and ends and bonded at their outer and inner surfaces to other strata contiguous therewith with a propellant mortar, said mortar having a burning rate which is substantially the same as the average burning rate of said charge, said axial perforation defined by the exposed inner surface of the innermost strata, said charge having its ends restricted and being bonded at its outer surface to said casing, said ignition means being in proximity to said axial perforations, said propellant material comprising a mixture of an inorganic oxidizing salt and a rubbery copolymer formed by polymerizing a vinyl pyridine and a conjugated diene having 4 to 6 carbon atoms per molecule.

8. A jet-propelled device according to claim 7 wherein the burning rate of said charge is progressive across said web.

9. A method for loading a jet-propelled device having a combustion chamber defined by a casing with a composite solid propellant charge comprising, in combination, the steps of bonding a plurality of imperforate grains of a first series together at their ends and sides with a propellant mortar and bonding the outer surfaces of said grains to said casing so as to form an initial cylindrical strata of propellant material, and bonding successive series of imperforate grains in a similar manner to previously loaded strata so as to form a plurality of concentric cylindrical strata, orienting and bonding the innermost strata in such a manner that its inner exposed burning surface defines an axial perforation, said propellant material comprising a mixture of an inorganic oxidizing salt and a rubbery copolymer of a vinyl pyridine and a conjugated diene having four to six carbon atoms per molecule.

10. A composite solid propellant charge generally cylindrical in form and having an axial perforation, comprising, in combination, a plurality of concentric cylindrical strata of propellant material, said propellant material comprising a mixture of ammonium nitrate and a rubbery copolymer of a vinyl pyridine and butadiene, each of said strata comprising a plurality of cylindrical imperforate segmental grains bonded together at their sides and to grains of other contiguous strata at their outer and inner surfaces with propellant mortar comprising a mixture of a polysulfide liquid polymer and ammonium perchlorate, said axial perforation being defined by the exposed inert surface of the innermost strata, the ends and outer cylindrical surface of said propellant charge being restricted.

References Cited in the file of this patent

UNITED STATES PATENTS

| 677,527 | Maxim | July 2, 1901 |
| 726,901 | Gathmann | May 5, 1903 |
| 778,788 | Maxim | Dec. 27, 1904 |
| 969,102 | Glass | Aug. 30, 1910 |
| 2,597,641 | Hull et al. | May 20, 1952 |

FOREIGN PATENTS

| 26,430 | Great Britain | Nov. 29, 1907 |
| 543,739 | Great Britain | Mar. 11, 1942 |